United States Patent [19]
Amon et al.

[11] 3,943,261
[45] Mar. 9, 1976

[54] PROCESS FOR WATER DISINFECTION AND CARBONATION

[75] Inventors: Anton Amon; Jason K. Sedam, both of Dunwoody, Ga.

[73] Assignee: The Coca-Cola Company, Atlanta, Ga.

[22] Filed: July 3, 1975

[21] Appl. No.: 592,959

Related U.S. Application Data

[63] Continuation of Ser. No. 398,373, Sept. 18, 1973, abandoned.

[52] U.S. Cl. ................. 426/67; 210/62; 426/330.3; 426/477; 426/590
[51] Int. Cl.² .......................................... A23L 2/00
[58] Field of Search .... 426/66, 67, 330, 335, 330.3, 426/532, 561, 569, 590, 477; 210/62, 64; 424/149

[56] References Cited
UNITED STATES PATENTS

| | | | |
|---|---|---|---|
| 700,464 | 5/1902 | Weyl | 426/67 |
| 2,071,990 | 2/1937 | Tiger | 426/365 |
| 2,662,855 | 12/1953 | Kamleo | 426/66 |
| 2,851,361 | 9/1958 | Diller | 426/365 |
| 3,296,122 | 1/1967 | Karassik et al. | 210/64 X |
| 3,650,405 | 3/1972 | Morrison | 210/62 |
| 3,779,909 | 12/1973 | Wisfield et al. | 210/64 X |

FOREIGN PATENTS OR APPLICATIONS

| | | | |
|---|---|---|---|
| 856,211 | 11/1970 | Canada | 424/149 |

*Primary Examiner*—S. Leon Bashore
*Assistant Examiner*—Kenneth M. Schor
*Attorney, Agent, or Firm*—W. Dexter Brooks

[57] ABSTRACT

A process and system is described for rapid disinfection of contaminated water particularly for use in post-mix carbonated beverage systems. The major components of the system include sequentially a water supply, carbonator pump, injector device, carbonator and dispenser. Moreover, as optional components, a reservoir and filter may be incorporated in the system between the carbonator and dispenser for safety factor purposes. The process comprises the introduction of chlorine into an available water supply line immediately before, or during carbonation, thereby reducing or eliminating the conversion of the chlorine present in the system to less active compounds. The process of carbonating the water results in chemically lowering the pH from alkaline ($>$ pH of 7.0) through neutral (pH 7.0) to acidic ($<$ pH of 7.0) thus affording the system of a more rapid and effective kill of pathogenic micro-organisms upon a controlled and effective injection of a liquid disinfectant, such as sodium hypochlorite, which may be used as the source of chlorine for the system. By introducing the liquid disinfectant at an acidic pH, a more instantaneous kill results without the necessity of using either an excessive quantity of disinfectant (chlorine) or large and expensive residence chambers requiring long residence times. The improved post-mix system provides dependable performance when used in conjunction with different water conditions throughout the world and permits the disinfected carbonated water to be dispensed along with a beverage syrup to produce a high quality carbonated beverage.

7 Claims, 2 Drawing Figures

PROCESS FOR WATER DISINFECTION AND CARBONATION

This is a continuation of application Ser. No. 398,373 filed Sept. 18, 1973 and now abandoned.

BACKGROUND OF INVENTION

The present invention relates to improvements in a post-mix carbonated beverage dispensing system, and in particular relates to a process for rapid water disinfection in such post-mix systems.

While it is typical for such a post-mix system to utilize water available at sales location, carbonate, cool and blend the water with syrups in proper ratio in an effort to produce a high quality carbonated beverage, in many parts of the world the available water for post-mix beverage systems is not reliable primarily due to the age and condition of municipal water systems, coupled with the sometimes frequent failure of pumping power. These undesirable conditions permit contaminated ground water carrying pathogenic micro-organisms in many cases to enter the water system. Also, it is common practice in some parts of the world to maintain water on roof tops, open to the atmosphere, to provide water under pressure when local systems fail. This practice of course leads to the potential of biological contamination from the air as well as from insects, birds and animals which may enter and occupy the tanks. Another water supply that is used on occasion in post-mix systems and subject to contamination is a well, particularly in those areas where sanitary waste disposal is imperfect and human wastes exist as a natural part of the water flowing into the well. Needless to say, in recent years, it has been difficult and in some areas virtually impossible to locate an acceptable and reliable water supply which may be combined with a beverage syrup to produce a high quality beverage without the addition of a costly, space consuming complex disinfection system for the water. These known disinfection systems, in addition to being costly and space consuming, generally require substantial electrical power to operate and because of the necessity of assuring effective kills, require disinfectant levels so high as to produce objectionable tastes in the water and finished beverage.

Accordingly, there has arisen a need in the industry for the production of an improved post-mix carbonated beverage system, preferably of simple and sturdy construction, inexpensive to manufacture and maintain, and having stable, efficient capabilities over extended use and when utilized with different water conditions throughout the world.

OBJECTS OF THE INVENTION

The present invention has for an object the provision of a relatively simple, dependable and stable post-mix carbonated beverage system. The invention is particularly adaptable for use in those parts of the world where the available water supply may be unreliable and possibility of disease exists. Still another object of the provision is a system which may be easily manufactured and efficiently handled during use and which, although of wide general application, is particularly useful for post-mix beverage dispensing systems. Another object of the present invention is to provide a carbonated beverage dispensing system of the above character which is adaptable for use with a contaminated water supply and wherein a more rapid and effective kill of pathogenic micro-organisms occurs without the necessity of excessively high levels of chlorine or other disinfectants and large residence chambers. A further object of the present invention is to provide a rapid disinfection process which takes advantage of the chemical and physical conditions inherent in a carbonating process to effect a practically instantaneous kill of micro-organisms without affecting the flavor of the finished carbonated beverage. Another object of the present invention is to intentionally use an acidic pH environment to produce maximum effectiveness of a liquid disinfectant when introduced into the water of a post-mix carbonated beverage system. These, other and further objects, important features and advantages of the further invention to which attention has not been specifically directed hereinabove will be better understood and appreciated by those skilled in the art by the following detailed description of the invention taken in conjunction with the accompanying drawings.

BRIEF DESCRIPTION OF DRAWINGS

The present invention will now be described, by way of example, by reference to the accompanying drawing.

DETAILED DESCRIPTION OF INVENTION

Figure 1:
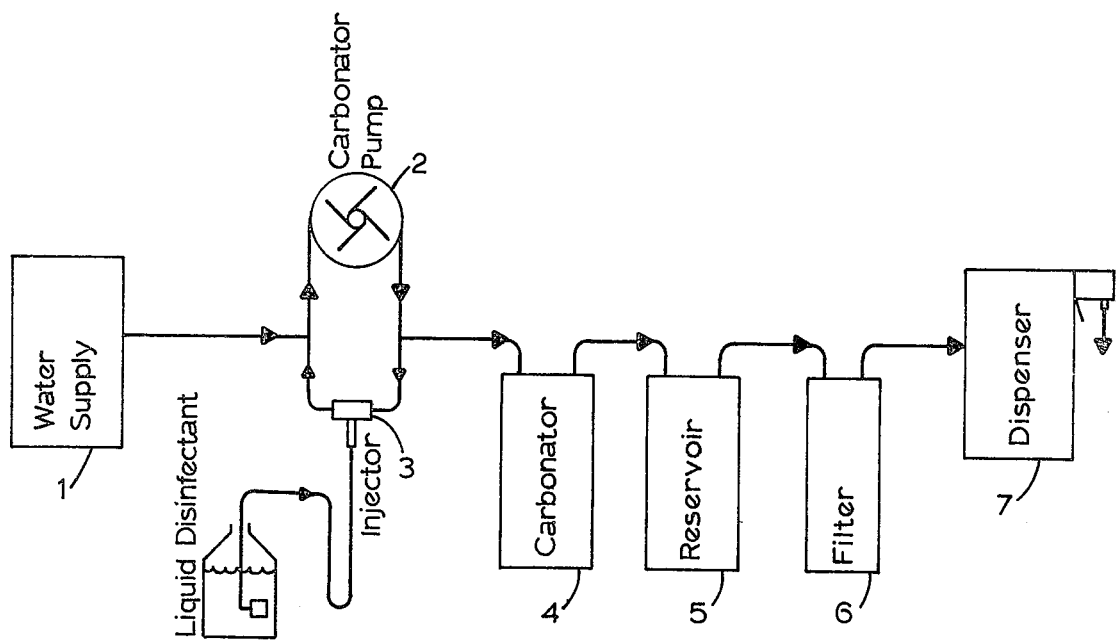
FIG. 1 is a schematic representation of a post-mix carbonated beverage system, including an injector assembly for water disinfection according to the present invention.

Referring now to the accompanying drawing, FIG. 1 illustrates a post-mix carbonated beverage system, including an injector assembly 3 for rapid water disinfection according to the present invention. The system includes a water supply 1, carbonator pump 2, with associated injector assembly 3 (liquid disinfectant), carbonator 4, reservoir 5, filter 6 and dispenser 7. It should be noted at this juncture that while the reservoir 5 and filter 6 are illustrated as components in the system, these components are not essential in the post-mix system to practice the present invention. Instead, as will be described in more detail below, these two components are provided as safety factors in the system to assure complete disinfection of the carbonated water despite the occurrence of any abnormal or adverse conditions during operation of the system.

In the manufacture of the usual type of post-mix carbonated beverage, it is customary for water to be brought to a carbonator from any suitable source by virtue of a suitable pumping arrangement. Once the water reaches the carbonator, it is carbonated with $CO_2$ under pressure and supplied to a dispenser where it is blended with a beverage syrup and dispensed as a high quality beverage. While the mixture of carbonated water and syrup should preferably be in the proportion of five to one, any other desired mixture could be selected so long as absolute uniformity in high quality taste is obtained.

It might be well at this point to provide theoretical explanations of the various features combined in our discovery of a rapid water disinfection treatment process.

For some time, chlorine has been universally recognized as an efficient destruction agent of micro-organisms. It is often added to industrial process waters to destroy bacteria and inhibit algae growth. Moreover, it is convenient and relatively inexpensive for routine use. Chlorine can be added to the water as a solid (i.e. calcium hypochlorite), liquid (i.e. sodium hypochlorite) or gas (injected directly into the stream of water).

Figure 2:
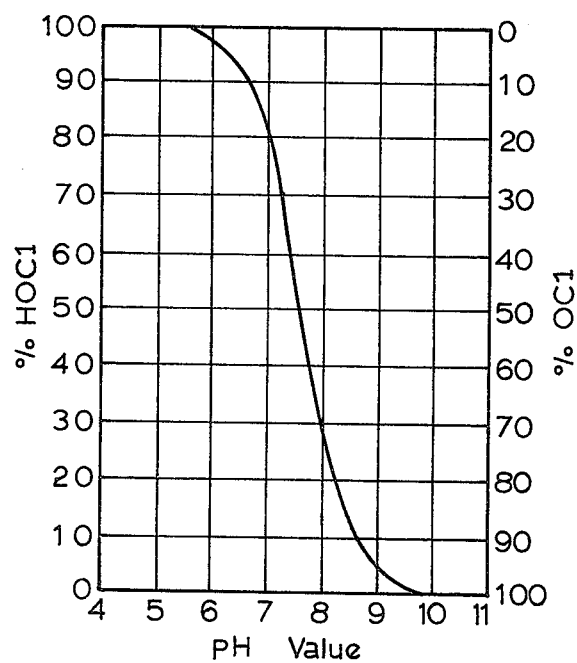
FIG. 2 is a graphical illustration of the distribution of hypochlorous acid and hypochlorite ion in water at different pH values at selected temperature of 20°C.

We have discovered that pH control plays a large part in obtaining effective bactericidal performance from chlorine. pH is a chemical symbol for the measurement of hydrogen ions in solution, or more simply, and more to the point, it is the measurement of acid-/alkali units. The degree of acidity or alkalinity is described by what is called a pH scale. The pH scale can be compared to a 14 inch ruler. That is, it runs from 0 to 14 . . . 7, the half-way point, is neutral. Anything below 7, from 7 to 0, is acid. Anything above 7, from 7 to 14, is alkaline. The measurement is logarithmic, which means that a single step in the scale represents a tenfold step in measure. Thus 8 is 10 times more alkaline than 7, 9 is 100 times more alkaline than 7, 10 is a thousand times, and so on until we reach 14 which gives us an approximate measure of 10,000,000 times more alkalinity than the neutral 7 or 100,000,000,000,000 parts alkaline to 1 part acid, because the same degree of measurement holds true on the acid side of the scale. That is, 6 is 10 times more acidic than 7 and so on. Chlorine exists in water as hypochlorous acid and hypochlorite ion. It is the hypochlorous acid that is active in killing bacteria. The distribution of hypochlorous acid to hypochlorite ion changes dramatically with the pH, as shown in FIG. 2. For example, at pH 7.0, 80% of the chlorine present is in the hypochlorous acid form, but at pH 8.0, only 30% exists as the acid. Therefore, in order to use the chlorine in solution efficiently, the pH should be kept below 7.6, and preferably below 6.0.

While we have found that the more acidic the water, the more effective the chlorine disinfection, we have also discovered as the water passes from alkaline (> pH 7.0) through neutral (pH 7.0) to acidic (< pH 7.0) the potential of corrosion and deterioration of the entire water system increases. For this reason, it is unusual to find municipal systems or wells which provide water at less than a pH 7. Normally, if the source of supply is much more acidic than pH 6.5, the pH is chemically adjusted to prevent disintegration of the water system due to the chemical attack of the compounds which caused the low pH originally. All previous efforts known to us which have been directed toward chlorine disinfection of water for post-mix systems have involved an injection device (generally a pump) and a large residence chamber for chlorinating the water and effecting kill before carbonation. These known types of systems are costly, space consuming, generally require additional electrical power and because of the necessity of assuring effective kills, require chlorine levels so high as to produce objectionable tastes in the finished beverage. The chlorine must then be effectively removed or reduced.

In contrast, we have discovered in the present invention that a typical carbonating reaction will generally use available water at pH 7.4, and, by the addition of $CO_2$ gas to a level of 4 volumes per volume of water, carbonate the water, and thereby reduce the pH to below 6.0 and normally approximate 4.0. By recognizing and taking advantage of these chemical and physical conditions that occur during the carbonating step and at such acidic pH environment, a more effective and rapid disinfection of water can be obtained without the use of high chlorine levels and large, expensive residence chambers. From a practical standpoint, a post-mix carbonated beverage system is suitable for acidic pH environment disinfection and capable of withstanding the corrosive attack and deterioration at this acidic pH because of the judicious selection of high quality materials which are normally associated with and/or utilized in such a post-mix system. We have found that by controlling the injection of sodium hypochlorite (source of disinfection for the system) into the carbonator, a practically instantaneous kill occurs, even at innoculation levels not normally found except in sewage. Of course, in the present invention, any one of several injection or proportion means might be used provided its cost and effectiveness is suitable to the disinfection end desired. The injector device 3 which is connected between the discharge and suction parts of the carbonator pump and which allows a flow from the high pressure to the low pressure side of the pump, preferably through a venturi, allows upon each carbonator pump cycle the recycling of a small amount of water nevertheless sufficient to power the venturi and draw in a small amount of sodium hypochlorite solution. While this solution is normally 5.25% for household use and 10.5% for industrial use, in the preferred embodiment and for the purposes of our post-mix system the solution is diluted to 0.0525% (99 + 1). Disinfecting power is measured in terms of a disinfecting specie in destroying micro-organisms. *E. Coli*, being somewhat more resistant than most pathogenic bacteria and being of fecal origin, is a useful reference or test micro-organism as well as an indicator of contamination. Hence, disinfecting efficiency is also referred to as colicidal efficiency. However, it must be kept in mind that viruses and amoebic cysts may be more resistant to chlorination than *E. Coli*.

Based on 99% kill of *E. Coli* in 30 min. at 2°–5°C, HOCl has a colicidal efficiency compared to OCl$^-$ in the approximate ratio of 80 : 1. The actual values being 0.005 ppm for HOCl and 0.42 ppm for OCl$^-$. Hence, at pH > 9.5, a residual free available chlorine concentration of 0.5 ppm is the minimum concentration necessary for 99% kill of *E. Coli* with 30 min. contact time at temperatures of 2°–5°C, in the absence of interferring substances.

Referring to FIG. 2, based on 100% kill of *E. Coli* in 1 min. at 2°–5°C, we have discovered a practically instantaneous disinfection, assuming the actual values are 2.0 ppm for HOCl and zero OCl$^-$ and if conducted at pH<5.5.

Some viruses and amoebic cysts which may be more resistant to chlorination than *E. Coli*, require residual concentrations larger than 0.5 ppm. The amount of residual free available chlorine necessary for disinfecting these micro-organisms may be estimated from the disinfecting efficiencies of chlorine for these micro-organisms. The observed disinfecting efficiency is generally approximated by the relationship.

$$C^n\, t_p = \text{Constant}$$

Where
 $C$ = concentration of disinfectant
 $t_p$ = time required to effect a percentage kill of the organism
 $n$ = coefficient of dilution
 When: $n \approx 1$ time of contact of organism with disinfectant and concentration of disinfectant are of equal importance in disinfection.

From the foregoing, it should be apparent that the exact amount of injection will be determined by local conditions. However, in the preferred embodiment, an amount of 4 ml per 1000 ml of carbonator pump delivery may be used to produce approximately 2 ppm of residual chlorine in the water discharged from the pump to the carbonator tank.

While not shown in the drawing, delivery of the carbonated water from the carbonator tank is generally directed through a cooling coil as demanded by the dispensing valve. Also, as described above in the preferred embodiment of FIG. 1, the carbonated water may be passed first through a reservoir 5 to allow sufficient time for the low concentration of chlorine to assure complete kill of smaller organisms. We have found that such reservoir 5 will provide the system with a safety time factor to assure disinfection of the more resistant organisms and can be of any particular size, but preferably of 5 gallons. Insofar as the operation of the reservoir 5, it should be connected to the carbonator 4 so as to be filled from the bottom for two reasons. First, since the water is highly carbonated, filling is more gentle and the carbonation level, and therefore the acidic pH, is better maintained as the system is initially charged. Secondly, should the water supply fail, the entire dispensing system would be shut down soon after such failure, rather than dispensing several gallons of carbonated water of gradually lowered carbonation volumes. Additionally, and particularly if pre-cooled water is used, the entering water is generally cooler than that which has been in the system for some time. Thus, because of convention, maintaining the stratification, and plug flow through the chamber is assured.

In addition to the reservoir 5, we have learned that another safety factor can be incorporated in the system in the form of a filter 6. While filter 6 is not required under normal operation conditions, we have found such filter 6 is desirable in those situations where large organisms are present. These larger organisms tend to form a hard cover (cyst) when attacked, and are difficult to kill quickly except by high concentrations of chlorine which as pointed out above are difficult but necessary to later remove. Needless to say, these large high concentrations of chlorine are highly objectionable to the consumer since they naturally affect the taste of the carbonated beverage. Thus, the particular disinfection process chosen should avoid the use of such high concentrations of chlorine.

The approach that we have discovered, which will prove effective in a post-mix operation, is to include such a filter 6 prior to the dispenser 7, said filter being designed to positively trap the large organisms and keep them in a low concentration chlorine solution for an extended time, where they will eventually die. Because of the filter 6, these large organisms will not pass through the dispenser 7, either live or dead and a high quality beverage will be dispensed. In addition to retaining the large organisms in the filter 6, we have discovered that the filter 6 (i.e. using activated carbon) will provide the usual filtration and removal of taste and odor resulting from use of small amounts of chlorine, and little or no effect on carbonation will be experienced by the use of such filter.

It should be apparent from the foregoing that we have developed an improved post-mix system which is designed intentionally to use the acidic pH environment during carbonation to produce the maximum effectiveness and a rapid rate of disinfection of contaminated water without adversely affecting the flavor of the finished carbonated beverage. The present invention avoids the use of any complex filtration except in those areas where excessively high levels of contamination are present or under abnormal or adverse operating conditions of the post-mix system. By providing a relatively simple injector assembly 3 in cooperation with the carbonating pump 2/carbonator 4, a dependable and stable system of rapid water disinfection is afforded by the present invention. The innovation may be easily manufactured and efficiently handled during use and which, although of wide general application, is particularly useful for post-mix beverage dispensing systems. By intentionally using an acidic pH environment to produce such rapid kill of pathogenic micro-organisms during the carbonation step, an improved carbonated water supply may be obtained which is capable of being blended with a beverage syrup into a high quality carbonated beverage.

It is believed that the present invention, its modus operandi, and many of its advantages attendant thereto, should be readily understood from the foregoing without further description, and it should also be manifest that, while a preferred embodiment of the invention has been shown and described for illustrative purposes, the structural details and procedural steps are nevertheless capable of wide variation within the purview of the invention. For example, while sodium hypochlorite solution has been described as the liquid disinfectant, any suitable disinfectant could be used instead. Also, while the suggested amount of injection of 4 ml per 1000 ml of carbonator pump delivery is disclosed, thus producing approximately 2 ppm of residual chlorine in the water discharge from the pump to the carbonator tank, this could instead, by restricting the additive inlet to the injector, approximate a proportion of 1 ml per 1000 ml or 0.5 ppm of residual chlorine in the water discharged from the carbonator pump to the tank. It should also be noted that while the injector assembly is illustrated in the drawing as comprising the venturi type of injector, the assembly instead may take the form of a positive displacement pump arrangement or a pressurized source of disinfectant. Moreover, it should be readily apparent that other types and sizes of reservoirs 5 and filters 6 may be used as safety factors in the post-mix system.

It should also be apparent that while the improved process and system has been illustrated and described in relation to a post-mix carbonated beverage system, it is capable of being used also to improve water disinfection of any water supply, whether such water supply be for potable water purposes (i.e. carbonated beverages, drinking water, ice making purposes) or nonpotable water purposes (i.e. sanitizing solutions, washing and cleaning purposes).

While a preferred embodiment of the invention has been disclosed and described herein, the present invention nevertheless is capable of a wide variation within the purview of the invention as defined in the appended claims.

The embodiments of the invention in which an exclusive property right or privilege is claimed, are defined as follows.

We claim:

1. A process for rapid disinfection of a water supply which is contaminated with micro-organisms and to be consumed either in the form of potable carbonated water, or as a carbonated beverage formed by admixture of said carbonated water with a beverage syrup, which comprises the steps of lowering the pH of the contaminated water to less than 6.0, but greater than 4.0, without the addition of a mineral or organic acid by the introduction of carbon dioxide gas into the contaminated water and, at substantially the same time, by injecting a sufficient amount of liquid halogen-based disinfectant into the contaminated water to achieve the complete elimination of non-cyst forming pathogenic micro-organisms and substantial reduction of non-pathogenic micro-organisms.

2. A process as defined in claim 1, wherein the disinfectant comprises substantially diluted sodium hypochlorite.

3. A process as defined in claim 2, wherein the amount of disinfectant injection comprises about 4ml per 1000ml of contaminated water to be disinfected, thereby producing approximately 2ppm of available chlorine in the contaminated water to be disinfected.

4. A process as defined in claim 1, wherein the substantially disinfected water is further subjected to a filtration step to assure complete disinfection by removal of large cyst forming micro-organisms by entrapping the large micro-organisms on the upstream side of the filter where they are destroyed by prolonged exposure to the disinfectant.

5. A process as defined in claim 4, wherein the substantially disinfected water is passed through activated carbon during the filtration step for removal of excess disinfectant, as well as objectionable tastes and odors.

6. A process as defined in claim 3, wherein the substantially disinfected water is further subjected to a filtration step to assure complete disinfection by removal of large micro-organisms by entrapping the large micro-organisms on the upstream side of the filter where they are destroyed by prolonged exposure to the disinfectant.

7. A process as defined in claim 6, wherein the disinfected water is passed through activated carbon during the filtration step for removal of excess disinfectant, as well as objectionable tastes and odors.

* * * * *